W. L. CARTER.
CONVERTIBLE AUTOMOBILE BODY.
APPLICATION FILED APR. 25, 1917.
1,343,655.
Patented June 15, 1920.
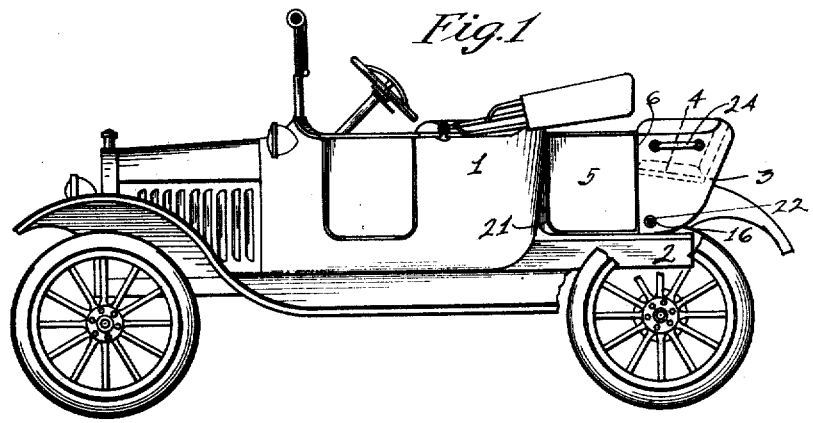
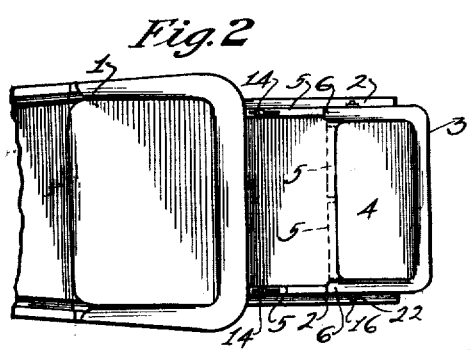
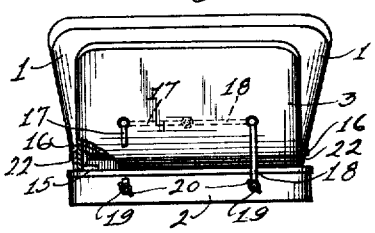
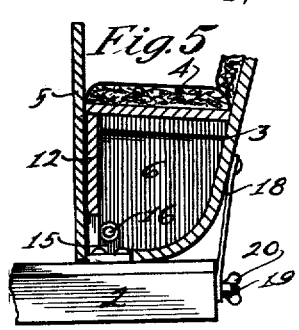
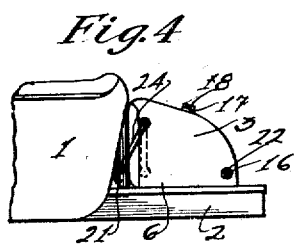
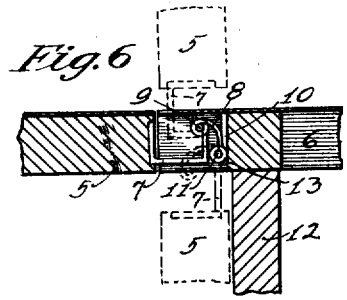
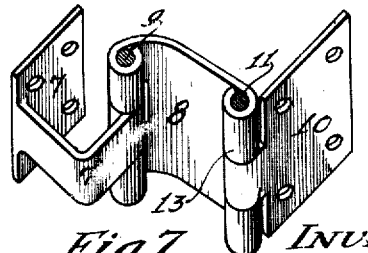
WITNESSES,
S. O. Albright
Kathryn H. Mack
INVENTOR,
Walter L. Carter,
By
Attorney.

UNITED STATES PATENT OFFICE.

WALTER L. CARTER, OF ONTARIO, CALIFORNIA.

CONVERTIBLE AUTOMOBILE-BODY.

1,343,655.     Specification of Letters Patent.     Patented June 15, 1920.

Application filed April 25, 1917. Serial No. 165,637.

*To all whom it may concern:*

Be it known that I, WALTER L. CARTER, a citizen of the United States, residing at Ontario, in the county of San Bernardino and State of California, have invented new and useful Convertible Automobile-Bodies, of which the following is a specification.

My invention relates to automobile bodies and particularly to a convertible tonneau which may be used in connection with the usual roadster type of bodies for converting such bodies from two passenger to four passenger bodies. Roadster bodies usually have what is known as "turtle backs," which in some cases are built into the bodies permanently, and in other cases are detachable therefrom. My improved tonneau is designed for use with the latter class of bodies and is arranged so that the original back may be removed on occasion and the convertible back substituted therefor. The design of the body is such that it may be permanently carried on the flat extended rear portion of the usual body in place of the turtle back, or, only occasionally substituted therefor.

An object of this invention is to provide means for rigidly attaching the improved back to the rear portion of the usual body so that it may be converted from use as a mere back for the body to a passenger carrying tonneau, or vice versa, at will, without removal from the vehicle, and with the minimum amount of effort and in the quickest time possible.

A further object is to provide means for substantially bracing the improved tonneau to the main body of the vehicle and for inclosing the tonneau with doors which may be swung inwardly and outwardly, the doors being capable of being folded inwardly against the front of the seat structure when not in use, in order to permit the turning of the back downwardly on to the rear platform. Other objects may appear as the description progresses.

Referring to the drawings, Figure 1 is a side elevation of a well known type of automobile showing my improved detachable back in position thereon in readiness for use for increasing the passenger carrying capacity of the vehicle. Fig. 2 is a fragmentary plan of the body shown in Fig. 1. Fig. 3 is a rear elevation of Fig. 2. Fig. 4 is a fragmentary elevation of Fig. 1 showing the back in closed position. Fig. 5 is a transverse sectional elevation of the seat and rear portion of the back. Fig. 6 is a sectional plan of the door connections and hinged supports, and Fig. 7 is a perspective view of the door hinges.

Similar characters of reference are employed in the several views of the drawings and throughout the specifications for indicating the same or like parts.

The main body 1 usually has an extended rear platform 2 to which is attached the removable backs hereinbefore mentioned and I provide, in lieu of the ordinary form of back, a structure which is somewhat longer and of different form than the usual backs, but which may be used, as stated, for the same purpose, but additionally, for carrying two additional passengers. This structure comprises the tapered rear portion 3 which is of substantially the width of the platform 2, a seat 4 which is built into the element 3 and extends across the entire width thereof, and a pair of side doors 5 which are hinged to the sides 6 of the member 3, for closing the openings between the member 3 and the rear end of the main body 1.

The doors are hingedly connected to the sides of the member 3 by means of the double acting hinges shown in Fig. 7 and comprise the right angularly formed members 7 capable of being suitably attached to the rear edges of the doors, the intermediate leaf members 8 pivoted thereto by means of the bolts or pins 9, and the flat members 10 which may be suitably attached to the sides 6 of the member 3, as shown in Figs. 6 and 7, the members 10 being hinged to the members 8 by means of bolts or pins 11. It is obvious that when the doors are swung outwardly of the body into the position shown in broken lines in Fig. 6, the hinge pin 9 will serve as a pivot therefor and the member 8 will rest against the member 10. On the other hand, when the doors are swung inwardly into positions paralleling the front member 12 of the seat structure, the heels of the hinge members 7 will rest against the bearings 13 of the members 8 and 10 and the bolts 11 will serve as pivots for the doors. The hinges are suitably recessed in the sides of the member 3 and suitable slots are provided in the sides to permit the movement of the hinge members therethrough. Ordinary locks 14 may be provided on the doors, as shown in Fig. 2 for holding the doors closed and sockets or fixtures may be provided on the rear of the main body 1 to receive the latch bolts. As any form of latch may be used for this purpose I do not show any particular means of locking the doors.

A pair or more of brackets 15 may be suitably attached to the platform 2, as shown in Figs. 3 and 5, for holding the back member 3 pivotally on the platform, a rod 16 being provided which extends entirely across the body, through the brackets and the sides of the back for this purpose. The brackets should be preferably mounted at points between the sides of the member 3 so that they may be inclosed thereby and thus prevent the marring of the outward appearance of the body.

A pair of straps of equal length, as at 17 and 18, are provided for bracing the back 3 in raised position on the platform 2. These straps are pivoted on pins or bolts to the rear side of the back and when not in use may be attached together in horizontal positions, as shown in broken lines in Fig. 3. The straps may be rigidly secured to the platform 2 by means of bolts 19 and wing nuts 20, as shown, or otherwise.

In some types of automobile bodies it may be necessary, on account of the inclination of the rear end of the body to provide filling pieces 21, as shown in Figs. 1 and 4 so as to provide a vertical face or abutment for the doors 5. The hinge rod 16 may be provided with cap nuts 22 at the ends, so that when the back is attached or detached from the platform, the placement or removal of the rod and nuts may be quickly accomplished.

The sides of the back member 3 are extended forward of the seats for a distance equal, approximately, to the width of the doors 5 in order that when the doors are closed inwardly preparatory to lowering the back into closed position a straight side will be presented which will leave no cracks or interstices. Suitable straps 24 are provided on the sides of the member 3 for attachment to the rear end of the main body 1 or to the filling pieces 21 for holding the back in its lowered position and when the back is raised these straps may be held in horizontal planes by any suitable means.

The space under the seat in the back 3 may be used for the storage of tools or implements and access thereto may be had through the seat or at other suitable points.

Having thus described my invention, what I claim, is:—

The combination with a main vehicle body having a platform extending rearwardly therefrom, of a seat pivotally supported on the rear end of said platform, and having vertical edges at the sides adapted to fold against the upper surface of the platform when the seat is closed, and to rest substantially at right angles to said platform when the seat is opened, vertical filling strips attached to the rear of the body opposite the edges of said seats, openings being formed between said filling strips and said seats when the seat is opened, and doors hinged to the sides of said seats and adapted to span said openings when in position for use, and to fold inwardly against the front edge of said seat when the seat is closed.

Signed at Los Angeles, in the county of Los Angeles and State of California, this 27 day of January, 1917.

WALTER L. CARTER.

Witnesses:
C. O. ALBRIGHT,
LUTHER L. MACK.